United States Patent [19] [11] 3,792,205
O'Dea [45] Feb. 12, 1974

[54] HAND HELD TELEPHONE TEST INSTRUMENT

[75] Inventor: Orrin B. O'Dea, Garden Grove, Calif.

[73] Assignee: Communication Mfg. Co., Long Beach, Calif.

[22] Filed: June 1, 1971

[21] Appl. No.: 148,435

[52] U.S. Cl. .................................................. 179/175
[51] Int. Cl. .............................................. H04m 3/22
[58] Field of Search. 179/175, 175.1 R, 175.11, 103

[56] References Cited

UNITED STATES PATENTS

| | | | |
|---|---|---|---|
| 3,632,878 | 1/1972 | Stratman | 179/175 |
| 3,627,930 | 12/1971 | Tolman | 179/103 |
| 3,084,230 | 4/1963 | Buhler | 179/175 |
| 3,627,932 | 12/1971 | Garrett | 179/175 |
| 3,492,488 | 1/1970 | Goettelmann | 307/311 |

FOREIGN PATENTS OR APPLICATIONS

| | | | |
|---|---|---|---|
| 879,843 | 6/1953 | Germany | 179/100 R |
| 953,078 | 3/1964 | Great Britain | 179/90 K |

OTHER PUBLICATIONS

Stromberg–Carlson "Crossreed 400 Electronic PBX", 10–20–69.

*Primary Examiner*—Kathleen H. Claffy
*Assistant Examiner*—Douglas W. Olms
*Attorney, Agent, or Firm*—Albert L. Gabriel

[57] ABSTRACT

A hand held telephone test instrument, which is in the general form of a telephone hand set and embodies circuit and mechanical components for performing the usual hand set functions of dial, talk and monitor, but which utilizes such components in novel combination with additional circuit and mechanical components for selectively performing comprehensive functional tests on telephone switching equipment of both the dial and "Touch-Tone" types, which testing has conventionally required the use of a separate complete "Touch-Tone" telephone as well as additional test sets which are complex, expensive and much too bulky to be carried by a telephone testman.

16 Claims, 4 Drawing Figures

INVENTOR.
ORRIN B. O'DEA
BY Albert L. Gabriel
ATTORNEY

INVENTOR.
ORRIN B. O'DEA

BY Albert L. Gabriel

ATTORNEY

HAND HELD TELEPHONE TEST INSTRUMENT

BACKGROUND OF THE INVENTION

The telephone switchman is normally equipped with a telephone hand set that is a very convenient hand held testing device, but is limited to the functions of dial, talk and monitor. According to current practice, any additional testing requires an array of complex, expensive and bulky equipment, which must be located and set up, and the operation of such equipment is generally beyond the scope of the ordinary telephone switchman, requiring a specially-trained, skilled operator.

Comprehensive functional tests on telephone switching equipment must be performed routinely to assure the correctness in operation and proper polarity within a switching system, and must be put into operation as rapidly as possible for evaluating equipment irregularities as they occur. Such functional tests include a leak test, a loop test, and a trace tone test requiring audible signal injection on the line, and these tests normally require the use of test sets which must be, for the most part, wheeled on carts and systematically connected to external power and to test jacks with a multiple of cords and connections. To do any extensive testing, a number of test sets, set-ups and associated devices are required. With the use of such testing equipment, should a trouble be encountered while dialing through, the location of the fault is usually not determined, due to the fact that while inter-connecting test devices, the circuit is generally inadvertently released and cannot be traced.

Another problem is connection with the testing of telephone switching equipment is that despite the current wide-spread usage of "Touch-Tone" signaling equipment, there is no convenient means presently available to functionally test such equipment, and it is thus conventional practice to carry a complete household telephone embodying Touch-Tone signaling, the cord of which has been modified for accessing the test connection to the equipment. The telephone used for such testing is useless for any other equipment testing beyond the equipment access for Touch-Tone.

A further problem in connection with the testing of telephone equipment is that the test sets which are conventionally used to perform comprehensive functional testing of telephone equipment are so complex and bulky that they are only satisfactory for use in the telephone central office, and they cannot normally be clipped onto a cable pair outside of the central office or utilized for the testing of "on station" equipment. Since the conventional telephone hand set utilized by the switchmen is not capable of such comprehensive functional testing, prior to the present invention there has been no satisfactory means for comprehensive cable and "on station" testing.

The following prior U. S. patents disclose the closest prior art of which the applicant is aware:

| | |
|---|---|
| 1,476,953 | 2,039,625 |
| 1,615,974 | 2,397,837 |
| 1,739,503 | 2,520,592 |
| 1,778,207 | 3,123,676 |
| 1,835,255 | 3,209,086 |
| 1,868,960 | |

SUMMARY OF THE INVENTION

In view of these and other problems in the art, it is an object of the present invention to provide a novel telephone test instrument in the general form of a hand set, which embodies not only the conventional hand set functions of dial, talk and monitor, but additional test functions conventionally requiring separate test equipment that is complex, bulky and generally limited to usage in the telephone central office.

Another object of the present invention is to provide a novel hand held telephone test instrument of the character described, which combines in a single portable instrument both a rotary dial and a Touch-Tone pad.

A further object of the invention is to provide in a hand held telephone test instrument circuit and mechanical components in a novel combination comprising a trace tone oscillator, a high gain amplifier, reverse polarity indicator means, and "loop" and "leak" pulse test means coupled with a rotary dial of the test set to be pulsed thereby.

Another object of the invention is to provide a hand held telephone test instrument of the character described wherein monitoring is performed through amplifier means coupled to the lines through a high impedance interface which will not cause the usual "clicks" on subscribers' lines when monitoring is performed during the servicing of working equipment.

A still further object of the invention is to provide a hand held telephone test instrument of the character described embodying a novel physical arrangement of transmitter, receiver, rotary dial, Touch-Tone keyboard and function selector switch, wherein all of these components are conveniently usable while the instrument is held in the palm of one hand.

An additional and more general object of the invention is to provide in a single hand held instrument a means for not only performing the usual hand set functions of dial, talk and monitor, but also for testing Touch-Tone signaling equipment and for rapidly accessing the mechanical and electrical parameters of the switching equipment within a central office, thereby avoiding the need for a multiplicity of separate devices for performing different functions, and saving valuable time of the telephone testman which would otherwise be spent locating, inter-connecting and setting up the conventional complex equipment.

Further objects and advantages of the present invention will appear during the course of the following part of the specification, wherein the details of construction and mode of operation of a presently preferred embodiment are described with reference to the accompanying drawings, in which:

DETAILED DESCRIPTION

Figure 1:
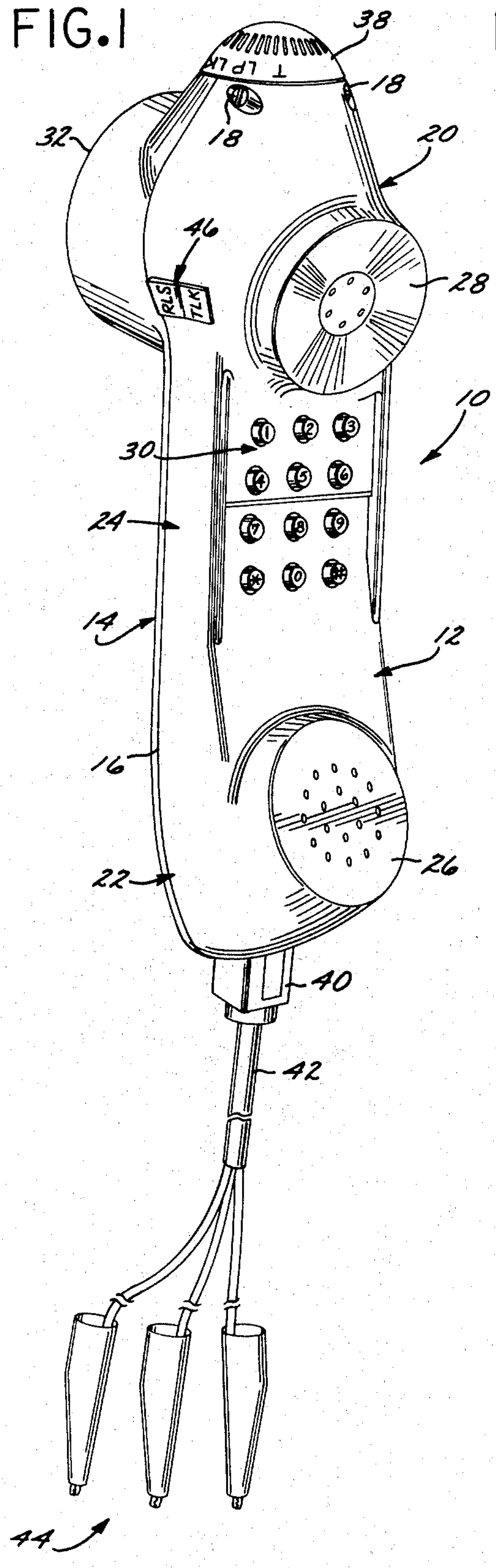
FIG. 1 is a prospective view of a telephone test instrument according to the invention, primarily showing one side of the instrument.
Figure 2:
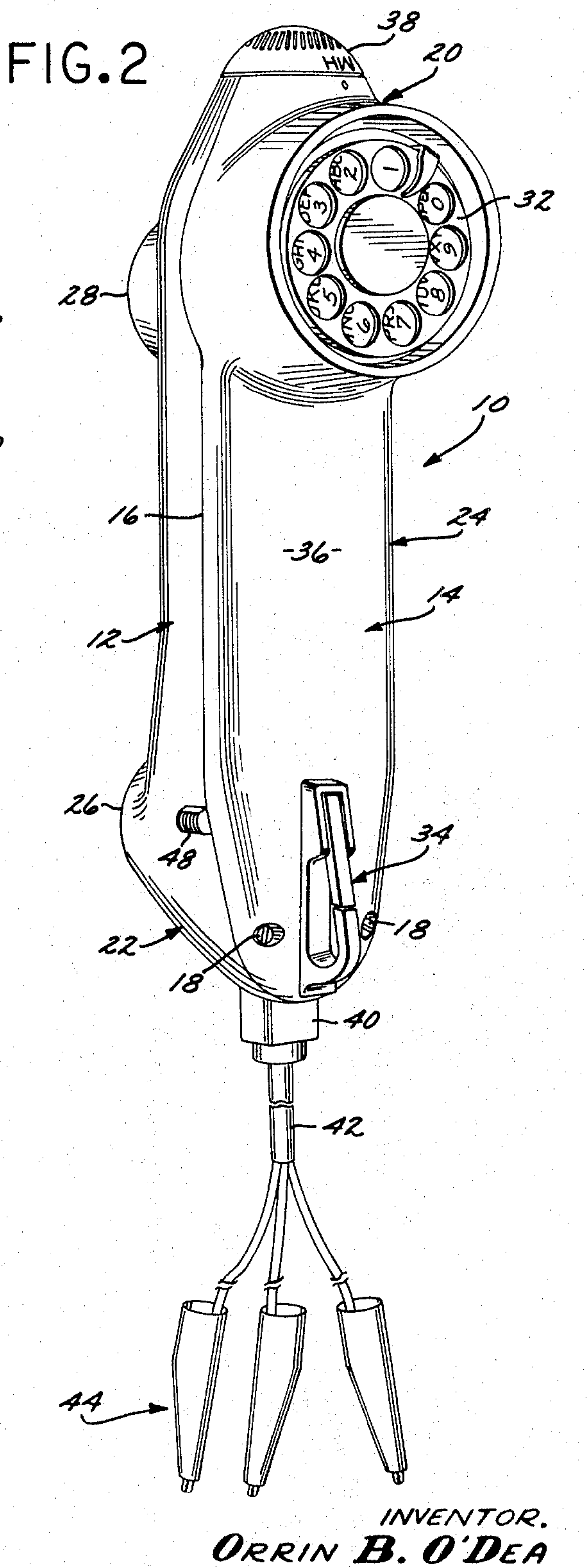
FIG. 2 is a prospective view similar to FIG. 1, but primarily showing the other side of the instrument.
Figure 3:
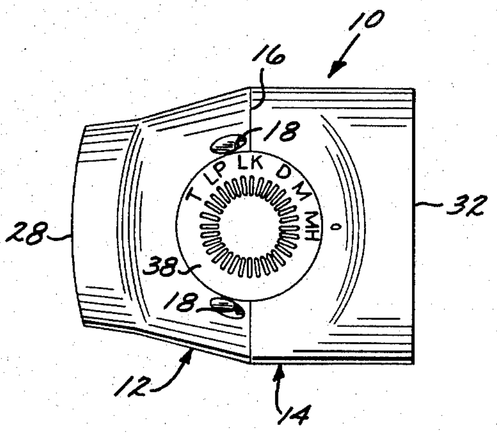
FIG. 3 is an end elevation view of the instrument, looking at the end located at the top of FIGS. 1 and 2.

Referring to the drawings, and at first particularly to FIGS. 1, 2 and 3 thereof, these Figures illustrate an assembled hand test instrument according to the invention which is generally designated 10, that preferably includes a pair of housing sections 12 and 14 that are held together along a seam 16 by means of a plurality of screws 18. For convenience in describing the structure and preferred mode of manipulation of the instrument 10, the housing section 12 best illustrated in FIG. 1, will sometimes hereinafter be referred to as the front housing section, the housing section 14 best shown in FIG. 2, will sometimes hereinafter be referred to as the rear housing section, and the upper and lower portions of the instrument 10 as viewed in FIGS. 1 and 2, will sometimes hereinafter be referred to as the upper portion 20 and the lower portion 22. The intermediate bridging portion of the instrument 10, disposed between the upper and lower portions 20 and 22, respectively, will sometimes hereinafter be referred to as the handle portion 24.

Referring now to FIG. 1, the front housing section 12 embodies a transmitter or microphone 26 in its lower portion 22, a receiver or earphone 28 in its upper portion 20, and a Touch-Tone keyboard 30 on the handle portion 24, intermediate transmitter 26 and receiver 28.

Referring to FIG. 2, the rear housing section 14 has a dial 32 in its upper portion 20, a support clasp 34 in its lower portion 22, and has an unobstructed intermediate holding portion 36, which forms the rear part of the handle portion 24 of the instrument.

A rotary selector switch 38 is disposed at the upper end of the instrument 10, overlapping both of the housing sections 12 and 14, while an electrical connector 40 releasably connects one of a plurality of interchangeable cords 42 to the instrument 10. The cord 42 illustrated in FIGS. 1 and 2, connects to three alligator clips 44 adapted for making tip, ring, and ground connections. It is to be understood, however, that other cord connections can be provided as desired for various usages of the instrument.

Two further functional features of the hand test instrument 10 are seen in FIGS. 1 and 2. These are a rocker switch 46, shown in FIG. 1, for "talk" and "release" functions, and a polarity indicating light 48, shown in FIG. 2, which illuminates in response to a reversal from normal line polarity.

This structural arrangement of the hand test instrument 10 is such that all functions thereof can be conveniently utilized with the instrument held in one position in one hand, which can be either the right hand or the left hand. Assuming the instrument is to be held in the left hand, with the palm of the left hand facing upwardly the instrument is placed with the holding portion 36 thereof in the palm of the hand, the upper portion 20 thereof adjacent to thumb, and the lower portion 22 thereof extending to the right of the little finger. This places the thumb on one side of the instrument and the other four fingers on the other side for gripping the instrument in generally the same manner as the conventional telephone hand set. As viewed in FIG. 1, the left hand would be facing out of the page and would be engaged from the left side of the page behind the instrument as viewed. This is the normal holding position for a telephone hand set to place the receiver 28 adjacent to the left ear of the user, and the transmitter 26 adjacent to the mouth of the user. This also conveniently allows the right hand to be used to actuate the Touch-Tone keyboard 30. By a simple clockwise twist of the arm and wrist, tending to tip the upper portion 20 of the instrument 10 to the right and out of the page as viewed in FIG. 1, the rotary selector switch 38 is first brought into convenient manipulating position for the right hand, and then the dial 32 is brought into convenient manipulating position for the right hand. With the instrument 10 thus engaged in the left hand, the polarity indicating light 48 is visible to the user, and the rocker switch 46 is convenient to the thumb of the left hand.

The instrument can similarly be held with the holding portion 36 thereof in the palm of the right hand, with the receiver 28 adapted to be placed proximate the right ear and the transmitter 26 proximate the mouth, which makes the Touch-Tone keyboard 30 conveniently accessible to the left hand, and also the rotary selector switch 38 and dial 32 readily accessible to the left hand by twisting the wrist and arm. The polarity indicating light 48 is readily visible in this position, and the rocker switch 46 is readily accessible to the right-hand index finger.

It is notable that the electrical connector 40 and cord 42 extend downwardly and are completely out of the way with the instrument 10 thus engaged in either the left hand or the right hand.

While the unique structural arrangement of the hand test instrument 10 as illustrated in FIGS. 1, 2 and 3 lends itself particularly to such convenient manipulation of the instrument, it is to be understood that the instrument can be manipulated in any desired way by a particular testman within the scope of the present invention.

Figure 4:
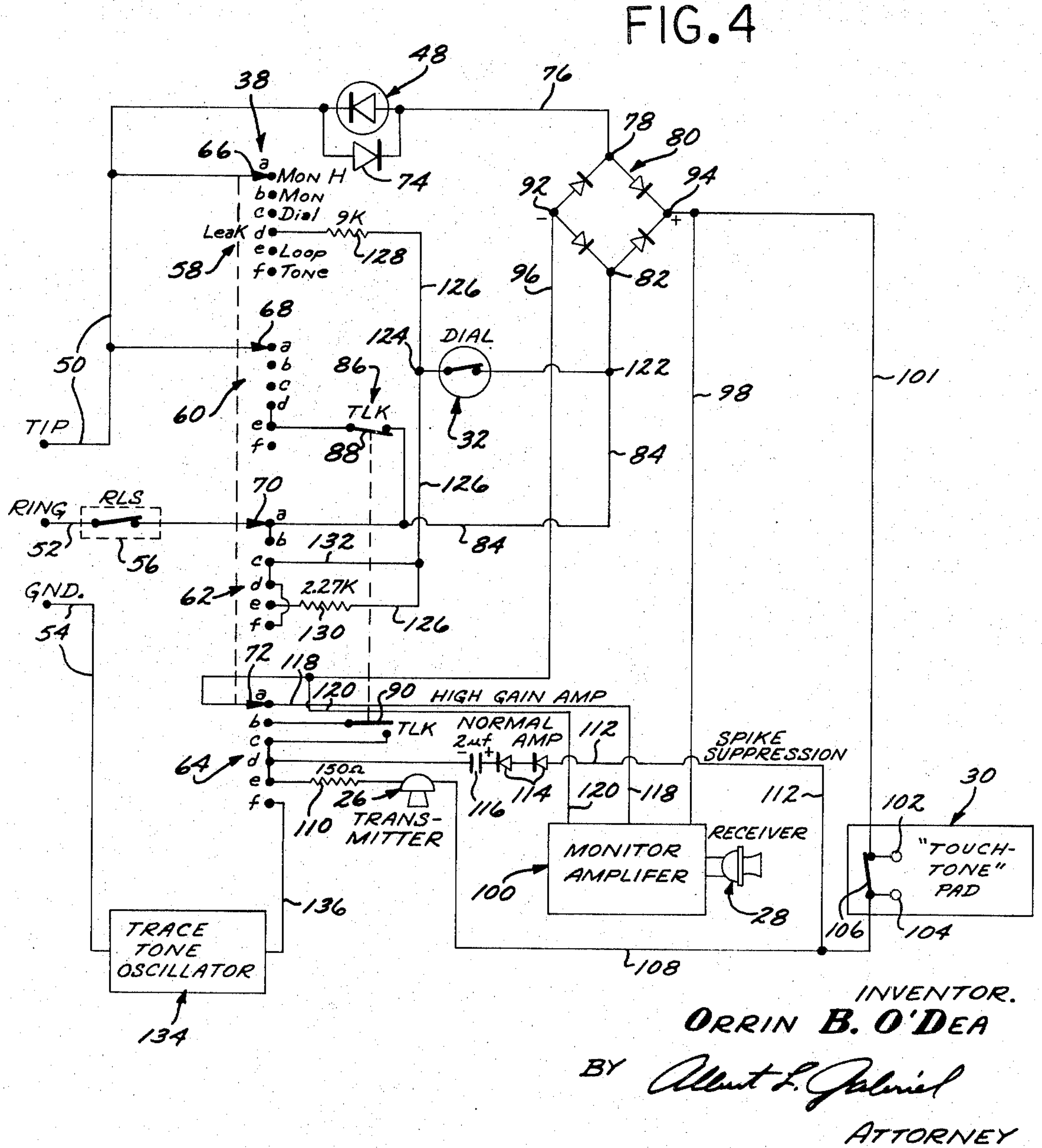
FIG. 4 is a circuit diagram of the presently preferred circuit embodied in a telephone test instrument according to the invention.

Reference will now be made to FIG. 4 of the drawings, which is a circuit diagram of a presently preferred electrical circuit embodied in the telephone test instrument 10 shown in FIGS. 1, 2 and 3.

"Tip," "ring" and ground conductors 50, 52 and 54, respectively, of the circuit are adapted for connection to telephone equipment through the electrical connector 40, cord 42 and respective clips 44 shown in FIGS. 1 and 2. The ring conductor 52 has a normally closed release switch 56 therein which is one side of the rocker switch 46 shown in FIG. 1 at the side of the instrument 10. The release switch 56 is adapted to be momentarily opened by depressing the RLS side of rocker switch 46 to open up the circuit, so as to release seizure on the pulsing relay in the central office.

The function switch, which is the rotary selector switch 38 shown at the top of the test instrument 10 in FIGS. 1, 2 and 3, is a ganged switch having four sections generally designated 58, 60, 62 and 64, respectively, and each of these sections includes six contacts which are respectively designated "a," "b," "c," "d," "e," and "f." The function switch 38 includes four wiper contacts 66, 68, 70 and 72, for the respective switch sections 58, 60, 62 and 64. With these wipers on the *a* contacts, the instrument is in the "monitor-high" operating condition for high-gain amplifier monitoring of low audio signals. With the wipers on the *b* contacts, the instrument is in the "monitor" operating condition for monitoring normal audio signals. With the wipers on the *c* contacts, the instrument is connected for either rotary or "Touch-Tone dialing. With the wipers on the *d* contacts, the instrument is in the "leak test" operating condition. With the wipers on the *e* contacts, the instrument is in the "loop test" operating condition. With the wipers on the *f* contacts, the instrument is in the "trace tone" operating condition.

The tip conductor 50 is connected to one side of a parallel combination of a diode 74 and a light emitting diode which is the polarity indicating light 48, the other side of this combination leading through a conductor 76 to one terminal 78 of a diode bridge network 80. The diode 74 and light emitting diode 48 are oppositely directed, so that with normal polarity the current will flow only through the diode 74 and the polarity indicating light 48 will be dark; while with a reversal of polarity the current will flow only through the light emitting diode 48 to illuminate the latter and thereby indicate the reversed polarity.

A terminal 82 of the diode bridge network 80 that is opposite terminal 78 leads through a conductor 84 to the *a* contact of section 60 of function switch 38. A talk switch 86 includes a normally closed contact portion 88 which normally connects the conductor 84 to the *e* and *d* contacts of section 60 of the function switch 38. Talk switch 86 also includes a normally open contact portion 90 which, when closed, electrically connects contact *b* of section 64 of function switch 38 to the contacts *c*, *d* and *e* of section 64 of function switch 38. Talk switch 86 is actuated to open its contact portion 88 and to close its contact portion 90 by depressing the TLK side of the rocker switch 46 shown in FIG. 1.

The diode bridge network 80 has negative and positive terminals 92 and 94, respectively, the bridge network 80 assuring these polarities regardless of possible polarity reversals between the tip conductor 50 and the ring conductor 52. This uniform relative polarity between the negative bridge terminal 92 and the positive bridge terminal 94 is essential to assure operation of three of the primary circuit elements, the Touch-Tone pad, the monitor amplifier, and the trace tone oscillator. A conductor 96 leads from the negative bridge terminal 92 to the wiper 72 of section 64 of the function switch 38. The positive bridge terminal 94 leads through one conductor 98 to the monitor amplifier 100, to which the receiver 28 is operatively connected. The positive bridge terminal 94 also leads through a conductor 101 to one Touch-Tone pad terminal 102, the pad also having a terminal 104 thereon. The Touch-Tone pad is normally bypassed by nominally closed contacts 106 across the terminals 102 and 104. Thus, the positive conductor 101 is normally connected through the Touch-Tone pad contacts 106 to a conductor 108 leading to one side of the transmitter 26, the other side of which is connected through a resistor 110 to the contacts *e*, *d* and *c* of section 64 of the function switch 38. Spike suppression is accomplished by a bypass line 112 extending from conductor 108 to the inter-connected contacts *c*, *d* and *e* of section 64 of function switch 38, the bypass line having a pair of diodes 114 and a capacitor 116 therein.

The tone dialing unit 30 is commonly referred to in the art as a Touch-Tone signaling unit, and is a proprietary system of Bell Telephone Laboratories, Incorporated, of New York, N.Y., of the general type shown and described in United States Letters Pat. No. 3,123,676, issued Mar. 3, 1964 for "Telephone Call Transmitter."

One side of the monitor amplifier 100 is connected as aforesaid through conductor 98 to the positive bridge network terminal 94. The other side of monitor amplifier 100 has two separate connections, a conductor 118 for high-gain amplification that is connected to the contact *a* of section 64 of function switch 38, and a conductor 120 for normal amplification that is connected to the negative conductor 96. Thus, the monitor amplifier will function at high gain in position *a* of the function switch 38, and will function at normal gain in all other positions of the function switch 38. In positions *d* and *e* of the function switch 38, for the leak and loop tests, respectively, such normal gain functioning of the monitor amplifier is effected only when the rocker switch 46 is depressed in the "talk" mode.

The dial 32 has normally-closed pulse contacts with respective terminals 122 and 124 at opposite sides thereof. The dial pulse contact terminal 122 is connected to the conductor 84, while the dial pulse contact terminal 124 is connected to a conductor 126. One end of conductor 126 is connected through resistor 128 that is employed in the "leak" test to contact *d* of section 58 of the function switch 38; while the other end of conductor 126 is connected through resistor 130 that is used in the "loop" test to contact *e* of section 62 of function switch 38. A bridging conductor 132 connects the conductor 126 to contacts *c*, *d* and *f* of section 62 of function switch 38.

The trace tone oscillator 134 has one side thereof connected to the ground conductor 54, and has its other side connected through a conductor 136 to contact *f* of section 64 of the function switch 38.

Operation of the hand test instrument 10 will now be described for the various functional tests.

MONITOR-HIGH

The monitor amplifier 100 is a transistorized amplifier having a high impedence interface which permits monitoring of the line without any "clicks" or other interference of the type caused by the conventional telephone hand set. Since the high-gain and normal sections of the monitor amplifier 100 embody conventional amplifier circuitry, the monitor amplifier has been illustrated as a block, rather than in circuit detail.

The high-gain section of monitor amplifier 100 is placed across the telephone line to be monitored by turning the selector switch 38 to the MH or "Monitor High" position, which places the four wiper contacts 66, 68, 70 and 72 of switch 38 on the *a* contacts of the respective switch sections 58, 60, 62 and 64. This connects the high-gain part of monitor amplifier 100 to receive electrical power from the line, one side of the monitor amplifier being connected to the positive terminal 94 of the bridge network 80 through conductor 98, while the other side of monitor amplifier 100 is connected through conductor 118, contact *a* of switch section 64, wiper 72 and conductor 96 to the negative bridge terminal 92. Thus being provided with power, the monitor amplifier will amplify audio signals on the line and feed the amplified signals to the receiver 28. The high-gain section of monitor amplifier 100 preferably provides approximately 10 decibel amplification.

MONITOR-NORMAL

Normal monitoring is provided by turning the selector switch 38 to the "m" or "Monitor" position, which places the wiper contacts 66, 68, 70 and 72 of function switch 38 on the *b* contacts of the respective switch sections 58, 60, 62 and 64. Positive voltage is applied to monitor amplifier 100 as before, from bridge contact 94 through conductor 98. Negative voltage is applied to monitor amplifier 100 through the conductor 120 and conductor 96 that is connected to bridge terminal 92. This electrical connection makes the monitor amplifier operative in its normal amplification mode for all positions of the function switch 38 except the "monitor-high" position, such operation requiring that the "talk side" of rocker switch 46 be depressed in the "loop" and "leak" positions of function switch 38.

In this operative condition of the instrument normal monitoring is performed without a high gain. Additionally, in this normal monitoring position the telephone testman can converse with another testman or subscriber should it be required, by pushing the "talk" side of the rocker switch 46 to close the normally open contact portion 90 of "talk" switch 86, thereby energizing the transmitter 26. One side of transmitter 26 is connected to the positive terminal 94 of the bridge network 80 through conductor 101, normally-closed Touch-Tone pad contacts 106 and conductor 108; while the other side of the transmitter 26 is connected to the negative terminal 92 of the bridge network 80 through resistor 110, interconnected contacts *e, d,* and *c* of switch section 64, talk switch contact portion 90, contact *b* of switch section 64, wiper 72 and conductor 96.

In both the normal and high monitor positions, the frequency response is 600–3,900 Hz. with a 900 ohm source.

DIAL (EITHER ROTARY OR "TOUCH-TONE")

The circuit is connected for the alternative use of either the rotary dial 32 or the Touch-Tone pad 30 by turning the selector switch 38 to the D or "Dial" position, wherein the wipers 66, 68, 70 and 72 of switch 38 are brought into engagement with the contacts *c* of the respective switch sections 58, 60, 62 and 64.

The rotary dial 32 is placed in series with the tip and ring conductors 50 and 52, respectively, as follows:

Dial contact terminal 124 is connected to ring conductor 52 through conductors 126 and 132, contact *c* of switch section 62, wiper 70 and release switch 56 which is one side of the rocker switch 36.

The other dial contact terminal 122 is conneced to the tip conductor 50 through bridge terminal 82, negative bridge terminal 92, conductor 96, wiper 72, the inter-connected contacts *c, d* and *e* of switch section 64, resistor 110, transmitter 26, conductor 108, normally closed Touch-Tone pad contacts 106, conductor 101, positive bridge terminal 94, bridge terminal 78, conductor 76 and either the diode 74 or the light emitting diode 48.

The Touch-Tone pad is alternatively operable, as when a Touch-Tone button is depressed the normally closed contacts 106 open, thereby placing the Touch-Tone pad in this same series circuit just described for the dial 32, allowing the Touch-Tone oscillator to be energized. The normally closed condition of both the pulse contacts of dial 32 and the Touch-Tone pad contacts 106 permits this novel series arrangement of the dial 32 and Touch-Tone pad 30 wherein each provides the necessary closed circuit while the other dial mechanism is being actuated.

In the event of misdialing with either the rotary dial or the Touch-Tone pad, the pulsing relay in the central office can be released for redialing by the simple expedient of momentarily depressing the RLS side of the rocker switch 46 so as to open the release switch 56.

LEAK TEST

The Class A leak test, commonly referred to as a "Leak A Test," is a standard test prescribed by Bell Laboratories which normally requires a test box or test set of the prior art type above referred to which is complex and bulky, wherein a Leak A network comprising a 10,250 ohm resistor bridged by a 2 microfarad capacitor is placed in series with a 5 kilohm resistor across the line. The Leak A Test then involves providing a pulsed connection of this Leak A network across the line which is pulsed at 12 impulses per second at a calibrated 61.5 percent break. The leak test that is performed with the present invention is a simulation of this Leak A Test which is very close in quality to a true Leak A Test, but eliminates the usual separate test box or set and utilizes a simplified circuit arrangement including the pulse contacts of the dial 32 and a single resistor, which is the resistor 128 in the circuit diagram of FIG. 4. The pulse contacts of the conventional dial 32 function at 10 pulses per second, with a 60 percent break, and it has been found that with this different pulse rate and different percentage break from those used in the conventional Leak A Test, a 9 kilohm resistor in series with the dial pulse contacts across the line is the approximate equivalent electrically of the conventional Leak A Test equipment.

The present test instrument 10 is adjusted for this leak test by turning the selector switch 38 to the LK or "Leak" position, which places the wiper contacts 66, 68, 70 and 72 of the function switch 38 in contact with the contacts *d* of the respective switch sections 58, 60, 62 and 64. This effectively places the 9 kilohm resistor 128 across the tip and ring conductors 50 and 52, respectively, when the pulse contacts of dial 32 are in the break condition, the resistor 128 in effect being shorted out when the pulse contacts of dial 32 are in the closed, normal position. In other words, the leak test resistor 128 is placed across the dial impulse springs.

This circuit arrangement results from connection of one side of the leak test resistor 128 to the tip conductor 50 through contact *d* of switch section 58 and wiper 66; while the other side of resistor 128 is conncted through conductors 126 and 132, inter-connected contacts *c connected and d* of switch section 62, wiper 70 and normally closed release switch 56 to the ring conductor 52. This will be the effective circuit of the leak test resistor 128 when the dial pulse contacts are in the break condition. However, when the dial pulse contacts are closed, there will be an electrical connection from dial contact terminal 124 through the dial 32 to dial contact terminal 122, and thence through conductor 84 and through the normally closed contact portion 88 of talk switch 86 to inter-connected contacts *e* and *d* of switch section 60, and thence through the wiper 68 to the tip conductor 50 to bridge and effectively short out the leak test resistor 128.

During this leak pulsing test, and also during the loop pulsing test described hereinafter, the bridge 80 is held shorted by the normally-closed contacts 88 of talk switch 86. This prevents any artificial load across the line under test during the leak test, and prevents any artificial load in series with the line under test during the loop test described hereinafter.

LOOP TEST

Bell Laboratories prescribes a 1,400 ohm loop test, wherein a series resistance is employed to assure correct operation of the dial pulsing equipment. The Bell Laboratories test set for performing this 1,400 ohm loop test comprises complex equipment utilizing 12 impulses per second with a 68.5 percent break. According to the present invention, such circuit arrangement is simulated with the use of the pulse contacts of the dial 32 and the 2.27 kilohm resistor 130, and it is found in practice that the resulting loop test is close in quality to the 1,400 ohm Bell Laboratories loop test, with the circuit arrangement employed in the present invention being the approximate equivalent electrically of the Bell Laboratories loop test circuit.

The hand test instrument 10 is utilized to perform this loop test by turning the rotary selector switch 38 to the LP or "Loop" position, which places the wipers 66, 68, 70 and 72 in contact with the *e* contacts of the respective switch sections 58, 60, 62 and 64. Dial terminal 124 is thus connected through conductor 126 and the loop test resistor 130 to contact *e* of switch section 62, and thence through wiper 70 and the normally closed release switch 56 to the ring conductor 52. The other terminal 122 of the dial 32 is connected through conductor 84 and through the normally-closed contacts 88 of talk switch 86 to contact *e* of switch section 60, and thence through wiper 68 to the tip conductor 50. In this manner, the loop test resistor 130 is placed in series with the line, such series arrangement being interrupted during the break portion of the dial pulse cycle.

TRACE TONE

When connected, the trace tone oscillator 134 provides a 1,000 Hz. tone interrupted at 3 cycles per second, which enables the instrument 10 to be used as a continuity tester or circuit tracer. The tone level is minus 2 dBM plus or minus 2 dB terminated to an open circuit; or, minus 10 DBM plus or minus 2 DBM terminated to a 600 or 900 ohm circuit. This trace tone thus constitutes an audible signal injection on the line.

The trace tone is provided by turning the selector switch 38 to the T or "Trace" tone position, which brings the wipers 66, 68, 70 and 72 into contact with the contacts *f* of the respective switch sections 58, 60, 62 and 64. The positive side of the trace tone oscillator 134 is connected to the ground conductor 54, while the negative side of oscillator 134 is connected through conductor 136, contact *f* of switcb section 64, wiper 72 and conductor 96 to the negative terminal 92 of the bridge network 80.

Since the trace tone oscillator per se embodies conventional circuitry, it has been illustrated in FIG. 4 in block form rather than in circuit detail.

An important aspect of the present invention, which will be apparent from the foregoing description and from the circuit diagram of FIG. 4, is that all of the test functions are performed with electrical power obtained from the telephone line, and no additional power source is required.

While the values of certain preferred circuit components are set forth hereinabove and in FIG. 4, it is to be understood that such values are set forth by way of example rather than limitation, and that the present invention is not limited to the particular circuit component values shown and described herein.

While the present invention has been shown and described herein in what are conceived to be the most practical and preferred embodiments, it is recognized that departures may be made therefrom within the scope of the invention, which is therefore not to be limited to the details as disclosed herein.

I claim:

1. A hand held telephone test instrument which comprises:

a. an elongated housing having upper and lower end portions and an intermediate handle portion, and having front and rear sides, b. receiver and transmitter components in the respective said upper and lower portions and accessible at the front side of the housing, c. dial signaling means in the housing having a rotary dial in said upper portion accessible at the rear side of the housing, and "Touch-Tone" signaling means in said intermediate handle portion of the housing and having a push-button keyboard accessible at the front side of the housing intermediate said transmitter and receiver components, d. said handle portion having a generally unobstructed holding surface on the rear side thereof adapted to be engaged in the hand of a user, e. first and second input conductors adapted for connection to the respective conductors of a telephone line, f. circuit means operatively connecting said receiver, transmitter, rotary dial signaling means and "Touch-Tone" signaling means to said input conductors, and g. a multiple position function switch means in the housing for selecting a plurality of test functions to be performed by the instrument.

2. A hand held telephone test instrument as defined in claim 1, wherein performed by the instrument, said function switch means having a manipulative portion accessible at said upper portion of the housing.

3. A hand held telephone test instrument as defined in claim 1, which includes second switch means in the housing alternatively operable from a neutral position to a first operative position to open a telephone line and to a second operative position to connect said transmitter to a telephone line, said second switch means having a manipulative portion accessible at said upper portion of the housing adjacent to said handle portion intermediate said front and rear sides of the housing for actuation of such manipulative portion by a finger of a hand of a user in which said holding surface is engaged.

4. A hand held telephone test instrument as defined in claim 1, wherein said circuit means includes a series circuit connection of said rotary dial and "Touch-Tone" signaling means, each of said signaling means including normally closed contact means in said series circuit connector which remains closed while the other signaling means is being operated, whereby said dial and "Touch-Tone" signaling means are selectively operable.

5. A hand held telephone test instrument as defined in claim 1, which includes monitor amplifier means having an output operatively connected to said receiver and a high impedance input selectively operatively connectable by said circuit means across said input conductors.

6. A hand held telephone test instrument as defined in claim 5, wherein said monitor amplifier means has selectively connectable normal and high gain portions.

7. A hand held telephone test instrument as defined in claim 1, which includes trace tone oscillator means having an output providing an audible trace tone signal selectively operatively connectable by said circuit means to at least one of said input conductors.

8. A hand held telephone test instrument as defined in claim 1, which includes leak test circuit component means selectively operatively connectable by said circuit means across said conductors.

9. A hand held telephone test instrument as defined in claim 8, wherein said leak test circuit component means comprises a parallel combination of a resistor and pulse contacts of said dial signaling means.

10. A hand held telephone test instrument as defined in claim 1, which includes loop test circuit component means selectively operatively connectable across said input conductors by said circuit means.

11. A hand held telephone test instrument as defined in claim 10, wherein said loop test circuit component means comprises a series combination of a resistor and pulse contacts of said dial signaling means.

12. A hand held telephone test instrument as defined in claim 1, which includes a parallel combination of a pair of oppositely directed diodes in at least one of said input conductors, one of which diodes is a light emitting diode, said diodes being so arranged that current will pass through and illuminate said light emitting diode upon a reversal from normal telephone line polarity, current passing through the other said diode with normal line polarity.

13. A hand held telephone test instrument as defined in claim 1, which includes monitor amplifier means having an output operatively connected to said receiver and a high impedance input selectively operatively connectable by said circuit means across said input conductors, trace tone oscillator means having an input providing an audible trace tone signal selectively operatively connectable by said circuit means to at least one of said input conductors, leak test circuit component means selectively operatively connectable by said circuit means across said input conductors, loop test circuit component means selectively operatively connectable by said circuit means across said input conductors, and diode bridge polarization network means in said circuit means assuring constant electrical polarity to said "Touch-Tone" signaling means, said monitor amplifier means and said trace tone oscillator means regardless of reversals in telephone line polarity.

14. A hand held telephone test instrument as defined in claim 1, wherein said circuit means includes function selector switch means selectively movable to positions for monitoring audio signals with said monitor amplifier, alternative signaling with said rotary dial and "Touch-Tone" signaling means, performing a leak test with said leak test circuit component means, performing a loop test with said loop test circuit component means, and circuit tracing with said trace tone oscillator means.

15. A hand held telephone test instrument as defined in claim 14, which includes normally closed release switch means in at least one of said input conductors adapted to be momentarily opened to release a telephone line.

16. A hand held telephone test instrument as defined in claim 14, which includes normally open talk switch means in said circuit means selectively closable to connect said transmitter with said input conductors.

* * * * *